United States Patent [19]
Reibl

[11] Patent Number: 5,410,377
[45] Date of Patent: Apr. 25, 1995

[54] DRUM-TYPE SLIDE MAGAZINE

[75] Inventor: Michael Reibl, Boeblingen, Germany

[73] Assignee: Eastman Kodak Company, Rochester, N.Y.

[21] Appl. No.: 191,680

[22] Filed: Feb. 4, 1994

[30] Foreign Application Priority Data

Feb. 6, 1993 [DE] Germany .................. 43 03 502.7

[51] Int. Cl.6 ............................................. G03B 23/00
[52] U.S. Cl. .................................... 353/107; 353/104; 206/456; 206/561
[58] Field of Search ............... 353/107, 104, 117, 108; 206/561, 562, 563, 565, 455, 456

[56]  References Cited
U.S. PATENT DOCUMENTS

| | | | |
|---|---|---|---|
| 3,276,314 | 10/1966 | Robinson | 353/107 |
| 3,386,195 | 6/1968 | Pester | 206/456 |
| 4,026,645 | 5/1977 | Bown et al. | 353/118 |
| 4,402,584 | 9/1983 | Palmer | 206/456 |
| 5,229,799 | 7/1993 | Silverstein et al. | 206/456 |

FOREIGN PATENT DOCUMENTS 1263342 3/1968 Germany .
2836999 8/1979 Germany .
1134176 3/1966 United Kingdom .

Primary Examiner—William A. Cuchlinski, Jr.
Assistant Examiner—William C. Dowling
Attorney, Agent, or Firm—Peter J. Bilinski

[57]  ABSTRACT

A drum-type slide magazine having a compartment body (11) which surrounds a magazine hub (1) and includes a series of radially extending compartment walls (15) to form slide compartments (17). The compartment body (11) is designed as a body separate from the hub (1) which is fixedly connected with said hub (1) by a connecting element (37).

20 Claims, 5 Drawing Sheets

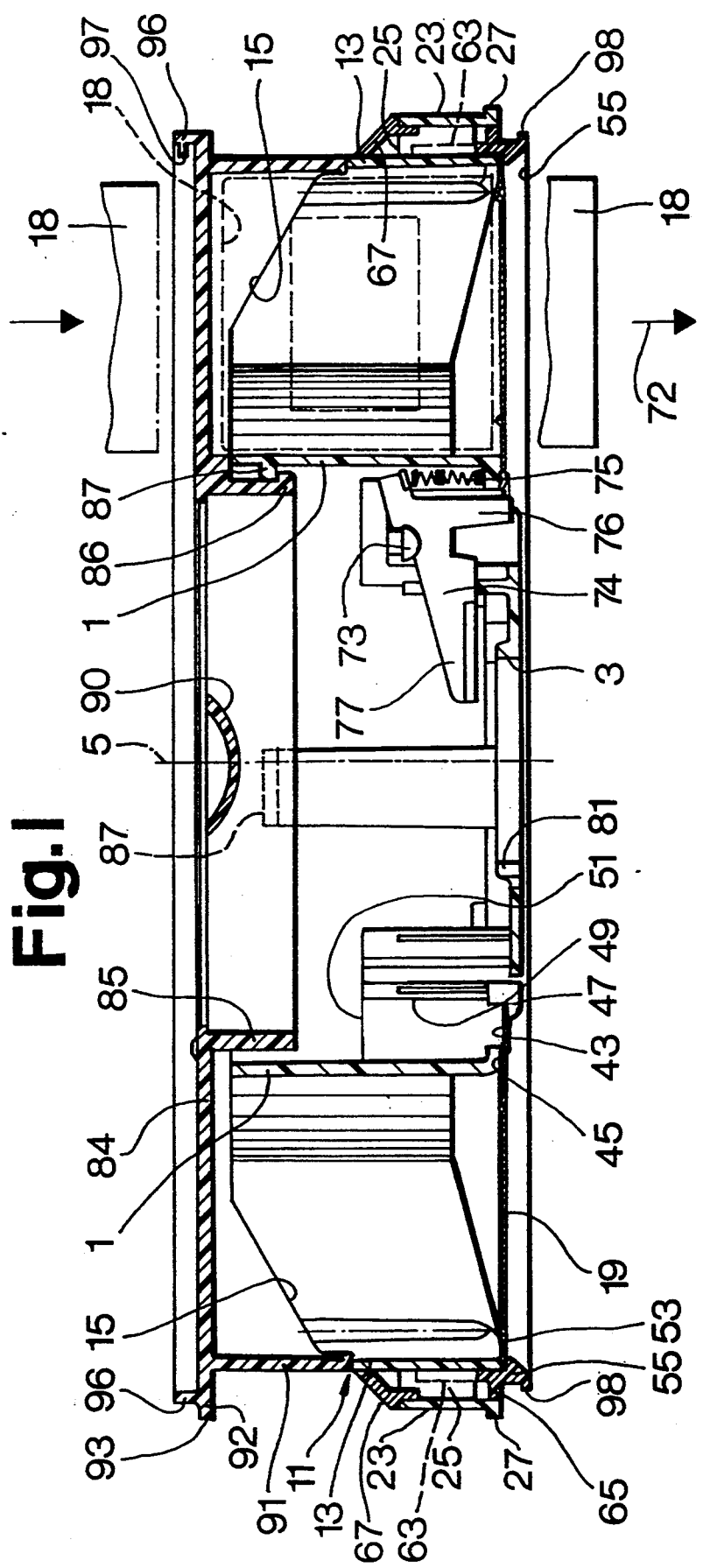

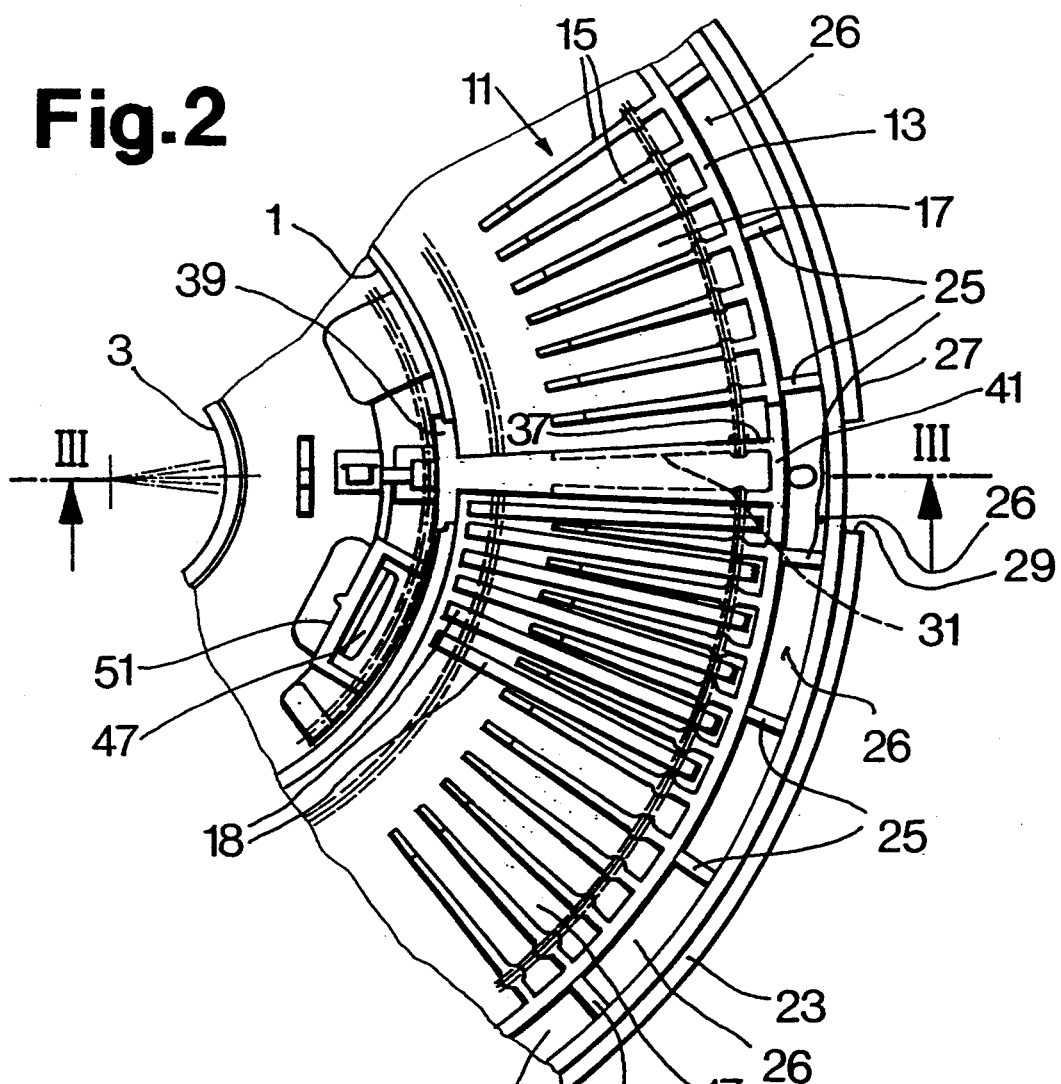
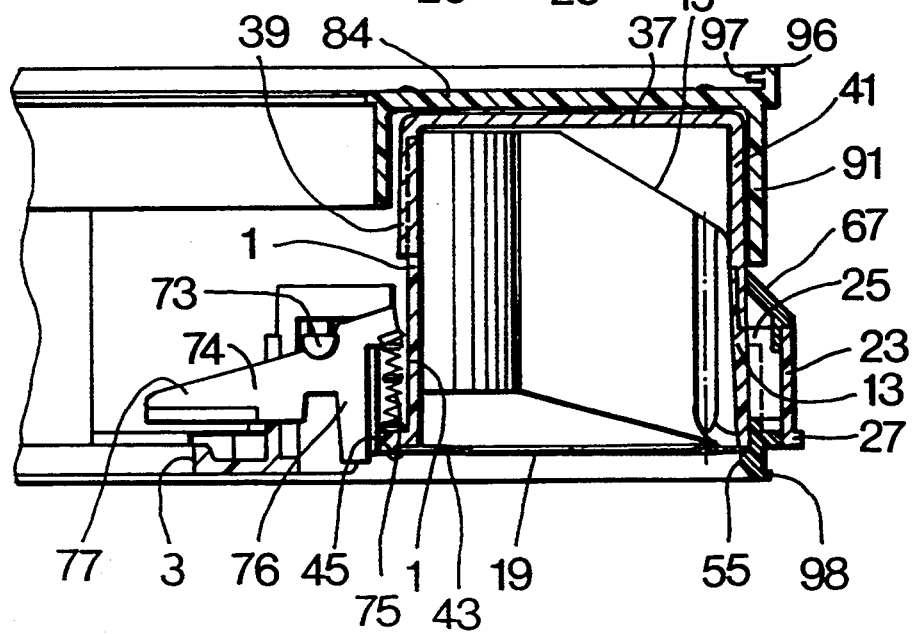

DRUM-TYPE SLIDE MAGAZINE

FIELD OF THE INVENTION

This invention relates to the field of drum-type slide magazines.

BACKGROUND OF THE INVENTION

In the case of both such drum-type magazines of the type known from DE-PS 1 263 342 and of rectangular slide magazines an important aspect is of how the magazine can be adapted to the different types of mounts of the slides which are to be accommodated in them. If a magazine is intended for slides mounted between glass the compartment body has slide compartments with a correspondingly adapted inner compartment width. Such a magazine would not be suitable for accommodating unglazed slides mounted in thin cardboard frames because a magazine with an inner compartment width adapted to thin narrow mounts and the same outer dimensions can accommodate a far greater number of slides. Accordingly, it has been found that a number of different magazines adapted to the different types of slides have to be available if slides with different mounts are to be projected. While this requirement can be met at relatively low cost when rectangular magazines are used, considerable costs are caused when drum-type magazines are used because they are much more complex and relatively expensive to manufacture.

It is the object of the invention to provide a drum-type magazine of the generic type which is particularly inexpensive to manufacture.

SUMMARY OF THE INVENTION

In the case of a drum-type slide magazine of the above-mentioned type this object is attained in accordance with the invention in that the compartment body is designed as a body which is separate from the hub and connected to said hub.

The invention relates to a drum-type slide magazine with a compartment body which surrounds a hub at least substantially concentrical with the axis of rotation of the magazine and has a plurality of compartment walls for forming slide compartments and at least one zero compartment, said walls extending in radial planes including the axis of rotation and being open at their two axial compartment ends to allow passage of the slides through the magazine in the axial direction, relative to the axis of rotation, the compartment ends being selectively closable and clearable at their lower side adapted for engagement with an associated projector by a bottom plate which is rotatable relative to said hub and has a cut-out slide passage opening.

The advantage is that if magazines according to the invention having differently designed slide compartments are to be manufactured, i.e. drum-type magazines with a small number of relative broad compartments for glass-mounted slides or with a substantially greater number of narrower slide compartments for unglazed slides, only one single component must be given a different design, namely the compartment body. All other components of the drum-type magazine such as a hub, a bottom plate and the locking mechanism required in such magazines in order to lock the bottom plate normally in such a rotary position that the slide passage opening is aligned with the zero compartment of the compartment body, as well as all other magazine parts can be made according to one single constructional design, without different extrusion dies being required for the various plastic components. Only for the compartment body itself does the manufacturer require different extrusion dies. Consequently, the magazine according to the invention is relatively inexpensive to manufacture and can be bought at a favorable price so that it is no problem for the user to afford a number of magazines adapted for differently mounted slides.

Advantageously the compartment body can be fixed with the hub by a connecting bracket preferably made from metal and extending like a spoke within the zero compartment between said hub and a circumferential annular wall of the magazine, with said connecting bracket being preferably connected with said hub and said annular wall of the magazine by positive engagement.

Using this type of connection of hub and compartment body, the radially inward ends of the compartment walls need not be held in contact with, or be attached to, the hub. The compartment walls can therefore advantageously terminate at a radial distance from the radially inward end of the compartment so that the compartments can be divided such that the slides are directly adjacent to each other at their radially inward ends, which results in an optimum slide accommodation capacity of the magazine.

A ring with clearly visible identification marks can be provided on the annular wall of the magazine to show, for example by its type of coloring, which type of magazine compartment body is used. The identification ring may be integral with the compartment body or may be a separate component, the latter allowing one and the same extrusion die to be used for all types of magazines, only the plastic material having to be dyed in different colors. The identification ring preferably has a marking surface inclined towards the axis of rotation of the magazine and facing obliquely upwards when the magazine rests on its lower surface so that it can be easily read from above. The marking surface can be provided with numbers for the slide compartments and a zero mark for the zero compartment.

If the user has a plurality of magazines at his/her disposal it is important that the magazines should be storable in a space-saving manner. Storing drum-type magazines in an upright position so that they require little foot space is hardly feasible because they tend to roll away. According to the invention this drawback is avoided in that the drum-type magazine can be closed at its top by a cover which can be releasably attached to the hub and whose outer peripheral edge has a flattened portion forming a plane foot section which is designed such that the magazine can be safely stored in an upright position with its axis of rotation horizontally disposed and the magazine resting in the area of its upper side on the flattened section of the cover and in the area of its lower side on a circumferential section.

A particularly advantageous way of storing a number of magazines is provided by the invention in that the upper side of the cover is provided with locking means which can be brought into releasable engagement with complementary locking means formed on the opposite lower side of the magazine. This allows a plurality of magazines to be safely connected to form a magazine column and to be stored axially one behind the other. The column of magazines can be stored horizontally with the column resting on the aligned foot sections of the magazine covers or it can be stored in a particularly space-saving manner as an upright tower.

A grip portion facilitating handling may be arranged on the cover such that the upper side of the cover remains freely accessible for locking with the locking means of the bottom of the magazine. For this purpose the grip portion may be designed such for example that it bridges a gripping recess in the upper surface of the cover or a cut-out portion of the cover. A grip portion thus designed defines a longitudinal axis functioning as a pointer. To this end the grip portion can be arranged on the cover in an orientation such that its longitudinal axis points to the zero compartment when the cover is mounted on the magazine, and thus clearly indicates the position thereof. This facilitates the mounting of the magazine on the associated projector in the correct rotary position. Since the longitudinal axis of the grip portion can be manually felt by the user without looking at it, the magazine can also be easily mounted in the correct rotary position under difficult conditions, which may be important if the projector is to be used in an upright orientation.

The invention will now be described in further detail with reference to an embodiment illustrated in the drawing wherein:

DESCRIPTION OF THE DRAWINGS

FIG. 1 is a cross-sectional view of a drum-type magazine according to the invention, FIG. 2 is a plan view, with parts broken away, of the embodiment without magazine cover and bottom plate, FIG. 3 is an enlarged sectional view along line III—III in FIG. 2, with parts broken away.

DESCRIPTION OF THE PREFERRED EMBODIMENTS

Figure 9:
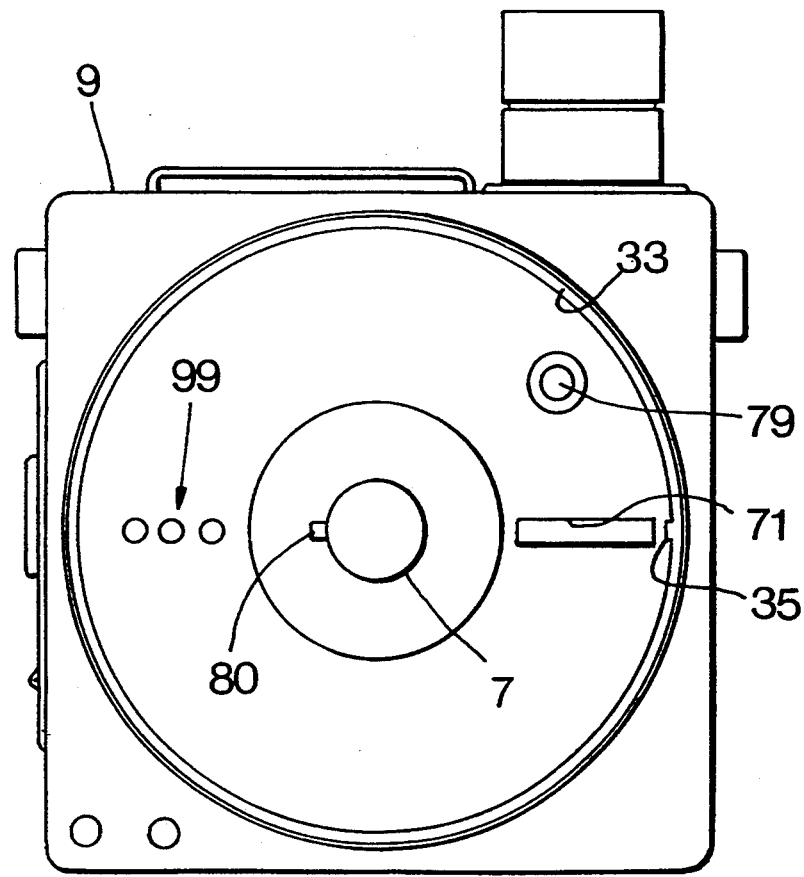
FIG. 9 is a schematically illustrated plan view of a projector without a drum-type magazine placed in position.

A hub 1 designed as an integral plastic component and generally shaped like a pot open at the top includes in its bottom a centrally disposed opening 3 which defines an axis of rotation 5 located in its center and is adapted to receive a centering pin 7, see FIG. 9, provided on the upper side of a projector 9 on which the magazine can be mounted.

Figure 6:
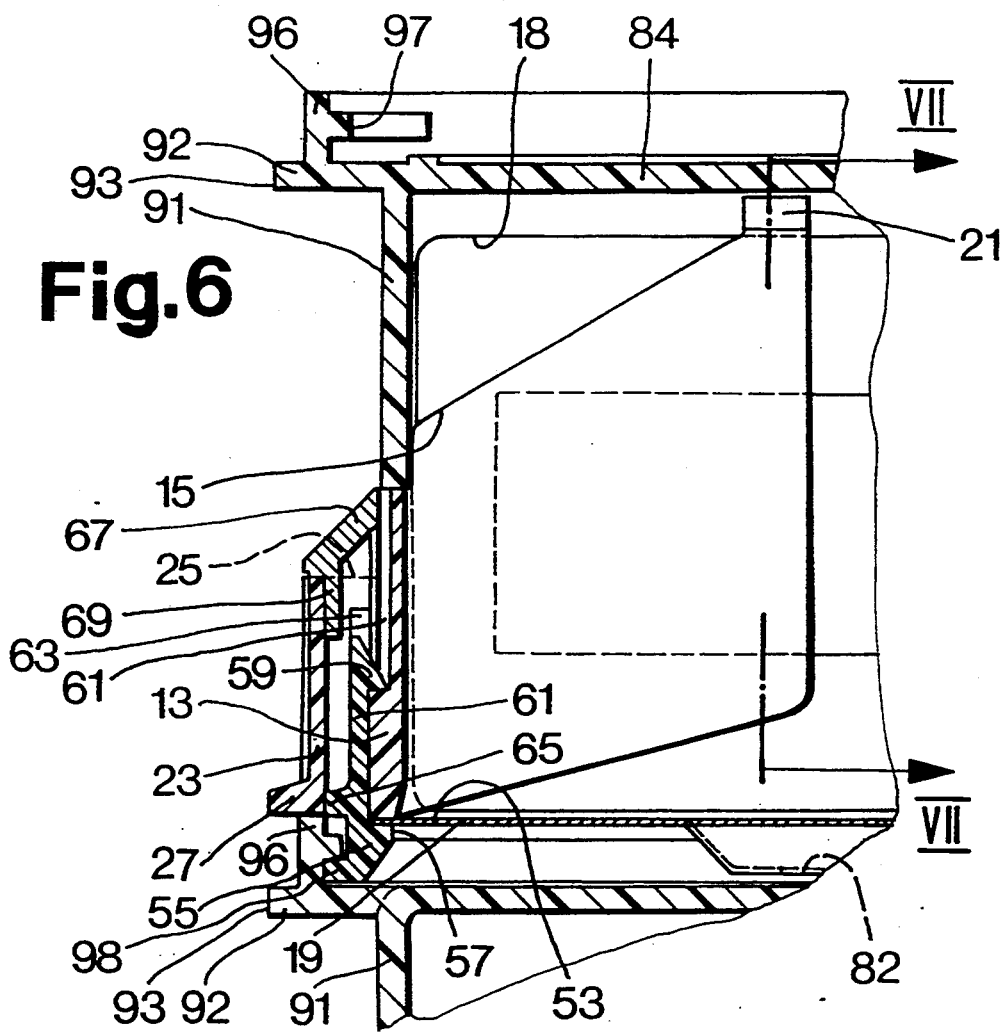
FIG. 6 is an enlarged cross-sectional view, with parts broken away, of parts of two magazines stacked one on top of the other and locked together.
Figure 7:
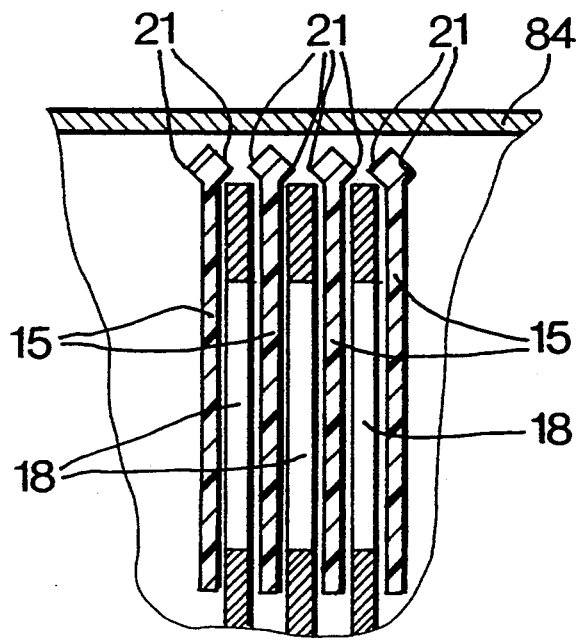
FIG. 7 is a sectional view along line VII—VII of FIG. 6, with parts broken away.

A compartment body generally denoted 11 in FIG. 2 which is an integral unit made from plastic is designed as a circular ring body with a closed circumferential annular magazine wall 13 having a number of compartment walls 15 integrally molded to its inner surface, said walls extending radially inwards towards the axis of rotation 5 to define between them a number of corresponding slide compartments 17. The annular magazine wall 13 does not extend over the total length of the slide compartments 17, as measured in the axial direction relative to the axis of rotation 5, but only forms the radially outward limit of the slide compartments 17 in an area extending from the bottom end of the compartments 17 to about half their heights, see in particular FIG. 6. FIG. 6 clearly shows that the annular magazine wall 13 extends with its upper edge slightly further than up to half the height of a slide 18 accommodated in a slide compartment and that the compartment wall 15 extends with its upper edge from magazine wall 13 obliquely upwards beyond the upper edge area of slide 18. In that latter area, the compartment walls 15 have projections 21 projecting from the plane of the wall on either side thereof for safely retaining the slides 18.

The slide compartments 17 are closed at their bottoms by a bottom plate 19 forming the lower end of compartment body 11 and designed as a substantially plane annular disk. Bottom plate 19 is rotatable relative to hub 1 and compartment body 11, which will be explained in further detail below.

As can be particularly inferred from FIGS. 2 and 6, an outer ring 23 provided for reinforcing magazine body 11 surrounds the annular magazine wall 13 concentrically and at a radial distance. Outer ring 23 forms an integral unit with annular ring wall 13 and is connected to said wall by connecting walls 25 which are radial extensions of the compartment walls 15 but are of smaller axial dimensions, i.e. heights than said walls. The connecting walls 25 divide the annular space between annular magazine wall 13 and outer ring 23 into a number of chambers 26 each extending over a circumferential length of three slide compartments 17, see FIG. 2. The length of the compartment walls 15, measured in the radial direction, is smaller than the length of the slides 18, i e. the radially inward ends of the compartment walls 15 are arranged at a distance from hub 1. This allows the division of the compartment body to be selected such that the slides 18 are almost in contact with each other at their inner edge areas facing hub 1, see FIG. 2.

In its bottom edge portion, outer ring 23 has an annular flange 27 which projects radially outwards and, except for an interruption in the form of a groove 29 best visible in FIG. 2, runs about the whole circumference of outer ring 23. Groove 29 is aligned with a so-called zero compartment 31 whose position in the compartment body is indicated in FIG. 2 by a horizontally disposed zero. Groove 29 serves as an entrainment groove for the rotation of the magazine as caused by projector 9. For this purpose the upper surface of projector 9 features a drive ring 33, see FIG. 9, which surrounds the annular flange 27, when the magazine is placed on the projector, and includes an entrainment nose 35 adapted to be received in groove 29 of annular flange 27. Drive ring 33 is rotatable by a driving system of the projector 9 which comprises a stepping motor as well as suitable electronic control means.

As can be most clearly seen in FIGS. 2 and 3, hub 1 and compartment body 11 are fixedly connected by a connecting bracket 37 consisting of metal and resembling a spoke whose middle section extends radially along zero compartment 31 and passes over the upper edges of the compartment walls 15 defining the zero compartment 31. Measured in the axial direction, these two compartment walls 15 have a height reduced by the thickness of connecting bracket 37 so that the upper face of connecting bracket 37 is flush with the upper edge of the other compartment walls 15. In its radially inward end section 39 which is broader than its spoke-type middle section, connecting bracket 37 is bent downwardly at right angles and received in a corresponding recess of the upright wall of hub 1, see FIGS. 2 and 3. This positive engagement is such that the parts can be fixedly connected by adhesive bonding or the like. In the radially outward end section 41 Which is also bent downwardly at right angles and broader than the middle section, a corresponding connection is provided by positive engagement with the annular ring wall 13, see FIG. 3.

Bottom plate 19, which is rotatable relative to hub 1 and compartment body 11 fixedly connected with said hub by connecting bracket 37, contacts at its radially inward annular edge 43 a lower mounting surface 45 of hub 1, see FIG. 1, the annular edge 43 being locked with mounting surface 45 by holding noses 47 such that there is sufficient play for the relative rotation of hub 1 and bottom plate 19. The holding noses 47 of which three are arranged at angular distances of 120$\phi$ about the axis of rotation 5 are integral with holding ribs 49 of inner box sections 51 of hub 1 and, as a result of the elasticity of the ribs 49, can be bent to such an extent that a snap connection of the noses 47 with the inner annular edge 43 of bottom plate 19 can be effected, see FIG. 1. The outer annular edge 53 of bottom plate 19 rests against the lower edge of annular magazine wall 13 which forms an abutment surface, see FIG. 1 and in particular FIG. 6. This abutment which forms the radially outward rotary mounting of compartment body 11 relative to bottom plate 19 is locked by a circular plastic holding ring 55 whose inwardly projecting annular rib 57, see FIG. 6, rests against the lower annular edge 53 of bottom plate 19.

Holding ring 55 is secured to compartment body 11 by several locking noses 59 received in recesses 61 of shoulders limiting the annular magazine wall 13. The locking noses 59 are provided in cut-out sections of portions 63 of which a plurality is uniformly spaced about the circumference of holding ring 55, and whose width, measured in the circumferential direction, corresponds to the distance, measured in the circumferential direction, between the connecting walls 25 between annular magazine wall 13 and outer ring 23. The portions 63 fit into the chambers 26 formed between adjacent connecting walls 25 between annular magazine wall 13 and outer ring 23 so that holding ring 55 is locked against rotation relative to compartment body 11 whereas it is locked in the axial direction by the locking noses 59.

An annular flange 65 projecting radially outwards and molded to holding ring 55 such that it is aligned with annular flange 27 of outer ring 23 rests with its radially outward annular edge against the inner wall of outer ring 23. Thanks to this type of engagement all parts are rigidly connected in the circumferential area of the compartment body while forming a mounting for rotary movement relative to the outer annular edge 53 of bottom plate 19, see FIG. 6.

Figure 5:
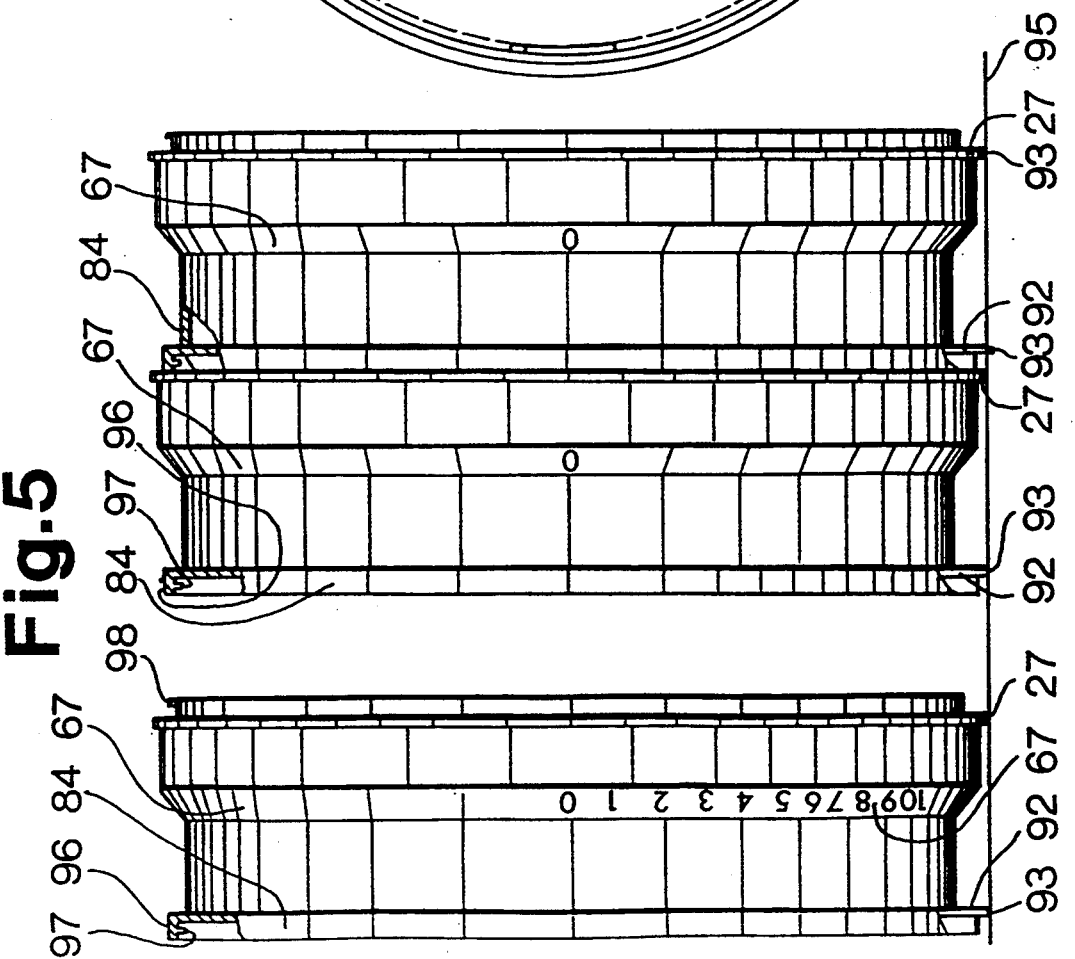
FIG. 5 is a lateral view showing the magazines in their upright positions, with parts broken away.

As can be clearly seen in FIGS. 1, 3 and 6, an identification ring 67 bearing data (see FIG. 5) for identifying the position of the zero compartment 31 and the slide compartments 17 covers the chambers 26 between annular magazine wall 13 and outer ring 23.

The identification ring 67 which is molded from carries the data on a plane annular surface which is upwardly inclined by an angle of 450 towards the upper edge of outer ring 23 and annular magazine wall 13 Identification ring 67 is secured in position by means of projections 69 which are held in frictional engagement with the chambers 26 defined by the connecting walls 25 between annular magazine wall and outer ring 23.

In FIG. 9, reference numeral 71 denotes a slide chute opening which is provided in the upper surface of projector 9 and to which the slides 18 can be vertically fed in the direction of the arrow 72 shown in FIG. 1 when the drum-type magazine is in its position on the projector 9. The slides are introduced through a passage opening not illustrated in the drawing which is cut out in the bottom plate 19 in a manner known for drum-type magazines. When the drum-type magazine is not in use bottom plate 19 is normally locked in a rotary position relative to hub 1 and compartment body 11 such that the passage opening of bottom plate 19 is aligned with zero compartment 31. FIGS. 1 and 3 show a locking lever 74 which is pivotable at 73 about hub 1 and biased by a spring 75 towards a position in which its locking arm 76 engages a locking notch at the inner annular edge 43 of bottom plate 19 if the plate's slide passage opening is aligned with zero compartment 31. When the drum-type magazine is placed on projector 9, engagement of centering pin 7 with lever arm 77 opposite locking arm 76 causes locking lever 74 to be pivoted in opposition to the force of spring 75 and the locking engagement to be released.

Figure 8:
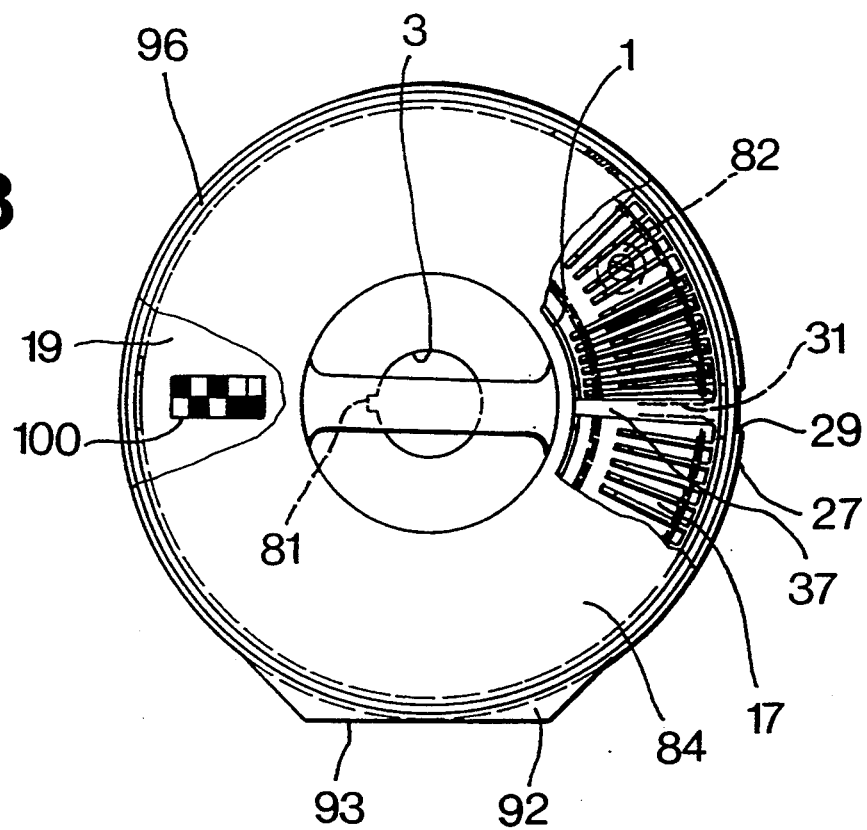
FIG. 8 is a plan view similar to that shown in FIG. 4 but illustrated on a smaller scale wherein a DX code is provided on the lower side of the magazine bottom plate.

In order to ensure that the drum-type magazine can only be placed on projector 9 and removed from it when it is located in a predefined rotary position relative to the projector 9 and the bottom plate 19 is located in a predefined position relative to hub 1 and compartment body 11, centering pin 7 on the upper surface of the projector has a lateral projection 80 adapted to pass through an associated recess 81 in the edge of hub opening 3. When hub 1 and bottom plate 19 assume the rotary positions relative to each other in which they are locked by means of locking arm 76, and the slide passage opening of bottom plate 19 is aligned with the zero compartment 31 of the compartment body 11, a positioning pin 79 projecting from the upper surface of projector 9 is received in a positioning opening 82 (indicated in FIGS. 4, 6 and 8 only) in bottom plate 19 of the drum-type magazine.

When the correct relative rotary positions have been assumed, i.e. when positioning pin 79 passes through opening 82 and projection 80 of the centering pin 7 of the projector is received in recess 81 of opening 3 of hub 1, the locking engagement is released in that pin 7 contacts arm 77 of locking lever 74.

A magazine cover 84 in the form of an integral plastic component comprises in its central area a cylindrical section 85 which protrudes from the plane of the cover and, when cover 84 is placed on the magazine, extends into the interior of hub 1, see FIGS. 1 and 3. At the outer edge of section 85 and the inner wall of hub 1 facing it, complementary integral holding means 86 and 87 respectively are provided which cooperate to form a type of bayonet lock which can be locked and unlocked by a limited relative rotation of cover 84 and hub 1. Three pairs of holding means 86 and 87 with associated abutments not illustrated in the drawing are arranged about the circumference of hub 1 such that cover 84 can be mounted on hub 1 only in a rotary position in which a mark 88, see FIG. 4, points to zero compartment 31 of compartment body 11. Mark 88 is a line situated on the longitudinal axis of a grip portion 89 which bridges in the central area of cover 84 the inner space of the cylindrical section 85 and, except for a central indentation 90, see FIG. 1, extends in the plane of the upper surface of the cover.

The circumference of cover 84 is formed by a round wall 91 which extends from the plane of the upper surface of the cover to the upper edge of the annular magazine wall 13 on compartment body 11. Wall 91 is exactly circular to match the shape of the annular magazine wall 13, except for a relatively short circumferential section which is illustrated in FIG. 3 and extends over the circumferential area of chamber 26, which is aligned with zero compartment 31, as well as the adjacent chambers 26 on compartment body 11. This circumferential section of wall 91 has a slightly outwardly protruding shape so that wall 91 can in this area surround connecting bracket 37 whose end section 41 is in turn aligned with the annular magazine wall 13.

Figure 4:
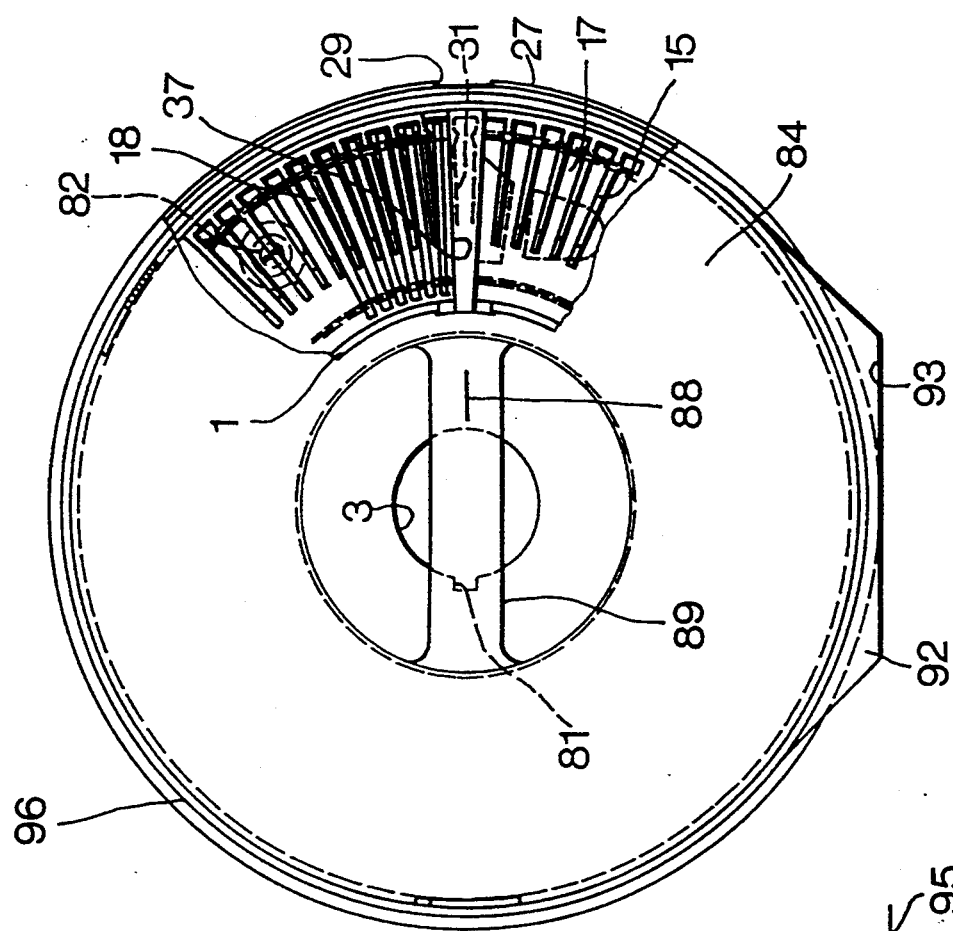
FIG. 4 is a plan view of the embodiment with the magazine cover mounted, presented on a smaller scale and with parts broken away.

As most clearly illustrated in FIGS. 4 and 6, cover 84 comprises on the level of the plane of its upper surface a specially designed circumferential edge which represents a flattened section in the form of a radially projecting rib 92. Its outer edge surface 93 defines a tangential plane of a radius which, relative to the axis of rotation 5 of the magazine, corresponds to the radius of the circumference of the annular flange 27 of compartment body 11. This edge surface 93 serves as a flat foot section which allows the magazine to be arranged, with the cover in place, in an upright position on a basis 95, see FIG. 5, in which it is supported by the edge of annular flange 27 and the flattened edge surface 93 of rib 92.

On its upper surface, cover 84 has an axially projecting annular rib 96 which is smaller than the edge surface 93 and which extends around the whole circumference. At its inner face, annular rib 96 includes a plurality of circumferentially spaced locking elements 97 which project radially inwards. These elements 97 cooperate with annular ribs 98 spaced about the lower edge of holding ring 55 to form a bayonet-type locking connection between the upper side of cover 84 and holding ring 55 of another magazine placed on the upper surface of cover 84.

Projector 9 comprises on its upper surface a sensor arrangement 99 consisting of a code reader for reading a DX code 100 applied to the lower surface of bottom plate 19 of the magazine. The code is indicated in FIG. 9 and for better understanding shown as if it were seen through bottom plate 19. By reading the data of code 100 by means of sensor arrangement 99 which cooperates with the electronic control means of the projector, the projector is automatically programmable for the type of magazine used so that the indexing drive for drive ring 33 can be automatically adjusted to the number of slide compartments 17 of the magazine used.

The number and sizes of the drum-type magazines can be chosen as desired, only the compartment body 11 having to be designed accordingly. All other components of the entire system remain unchanged for all magazine variants.

The foot section formed by edge surface 93 of cover 84 allows the magazine to be stored not only in a horizontal position but also to be safely disposed in an upright position. Since the upper surface of the cover can be locked with holding ring 55 on the lower side of the magazine a plurality of magazines can be stacked and locked together to form a magazine column which can be stored in an upright position or horizontally on the edge surface 93 (with the magazines in upright positions), see FIG. 5.

No matter in which position the magazines are stacked or stored, the type of magazine concerned can be readily identified on the identification ring 67 which is visible on all magazines in any position.

As shown in particular in FIG. 4, the plane of edge surface 93 of cover 84 extends in parallel with the longitudinal axis of grip portion 89 which in turn (see mark 88 in FIG. 4) is aligned with the zero compartment 31 of the magazine. The position of the zero compartment 31 is thus advantageously not only visible but can also be felt when the grip portion 89 is gripped. This assists in aligning the magazine relative to the projector, which is particularly useful if the projector is used in low light conditions or in an upright position.

What is claimed is:

1. A drum-type slide magazine having a compartment body (11) which surrounds a hub (1) at least substantially concentric with the axis of rotation (5) of the magazine and having a plurality of compartment walls (15) for forming slide compartments (17) and at least one zero compartment (31), said walls extending in radial planes including the axis of rotation (5) and being open at their two axial compartment ends to allow passage of the slides (18) through the magazine in the axial direction, relative to the axis of rotation (5), the compartment ends being selectively closable and clearable at their lower side adapted for engagement with an associated projector (9) by a bottom plate (19) which is rotatable relative to hub (1) and has a cutout slide passage opening, characterized in that the compartment body (11) is designed as a body which is both separate from hub (1) and connectable to said hub (1), wherein said hub (1) forms an inner circumferential wall of said magazine when said compartment body (11) surrounds said hub (1).

2. A magazine according to claim 1, characterized in that the compartment body (11) comprises an annular circumferential magazine wall (13) which defines the radially outward limit of the compartments (17) and carries the compartment walls (15) which extend radially inwards towards hub (1).

3. A magazine according to claim 2, including a connecting bracket (37) which extends within the zero compartment (31) between annular magazine wall (13) and the hub (1), said bracket (37) being fixedly connected to said hub (1).

4. A magazine according to claim 1, characterized in that the compartment walls (15) terminate at a radial distance from the radially inward end of the compartment.

5. A magazine according to claim 2, including an outer circumferential area of bottom plate (19) rotatably guided on a contact surface of the annular magazine wall (13).

6. A magazine according to claim 5, characterized in that bottom plate (19) is guided on the contact surface of the annular magazine wall (13) by means of a holding ring (55) which encloses the lower circumferential area of the annular magazine wall (13) and is lockable with said wall by a snap connection formed by complementary locking means (61, 59) integral with said wall and the holding ring (55).

7. A magazine according to claim 5, characterized in that the annular magazine wall (13) is reinforced in its lower section by an outer ring (23) which is radially spaced from the annular magazine wall (13) and concentrical therewith and in some areas integrally connected therewith, in that the major part of holding ring (55) extends axially into the space between annular magazine wall (13) and outer ring (23) and in that the locking means (59, 61) are arranged in said space.

8. A magazine according to claim 7, characterized in that the outer ring (23) is connected to annular magazine wall (13) by connecting walls (25) forming radial extensions of selected compartment walls (15) which divide the annular space between annular magazine wall (13) and outer ring (23) into a number of chambers (26).

9. A magazine according to claim 8, characterized in that holding ring (55) includes an annular flange (65) radially projecting in a plane running perpendicular to the axis of rotation (5) and extending along the lower ends of the connecting walls (25), said flange resting with its radially outward end surface against the inner wall of the surrounding outer ring (23) and forming a limiting bottom wall of the chambers (26).

10. A magazine according to claim 9, characterized in that the upper ends of the chambers (26) opposite the bottom end and adjacent to the cover are closed by an identification ring (67) which is preferably a separate component and forms an annular surface extending from the upper end of outer ring (23) to the annular magazine wall (13) and is provided with visually recognizable identification marks related to the magazine and/or with a color code.

11. A magazine according to claim 10, characterized in that the annular surface of identification ring (67) is inclined by an angle of about 45φ to the axis of rotation (5) of the magazine such that the end of the annular surface associated with the outer ring (23) is situated more closely to the bottom side.

12. A magazine according to claim 1, characterized in that the lower side of bottom plate (19), which is adapted to rest on the associated projector (9), has a machine-readable DX-code (100) with data related to the magazine and in that projector (9) includes a code reader (99) aligned with the code of the magazine positioned on the projector, said code reader interacting with the projector control means for transmission of the data read out.

13. A magazine according to claim 1, characterized by projections (21) laterally projecting from the plane of the compartment walls (15) and integrally molded to the edge section of the compartment walls (15) remote from bottom plate (19) and adjacent to the cover for preventing slides (18) from dropping out of the compartments (17).

14. A magazine according to claim 1, said magazine being at least partially closable at its upper side by a cover (84) which can be releasably attached to hub (1), characterized in that for forming a plane foot section, cover (84) features at its circumferential edge a flattened portion (92) which, relative to the axis of rotation (5) of the magazine, to define a tangential plane (93) with respect to a radius whose size corresponds at least approximately to the radial distance by which the radially outermost circumferential area (27) of compartment body (11) is spaced from the axis of rotation (5) and in that said circumferential area (27) of compartment body (11) is located at a smaller axially measured distance from the bottom plate (19) than from cover (84).

15. A magazine according to claim 14, characterized in that the upper surface of the cover is provided with locking means (97) which can be brought into releasable engagement with complementary locking means (98) formed on the lower side of the magazine remote from cover (84).

16. A magazine according to claim 15, characterized by a grip portion (89) arranged on the upper surface of cover (84) such that said upper surface is accessible for being locked with the locking means (98) of the lower side of the magazine.

17. A magazine according to claim 16, characterized in that grip portion (89) has a shape defining a longitudinal axis (88) and in that said longitudinal axis (88) is disposed at a preselected angle to the tangential plane (93) of the foot section of the cover.

18. A magazine according to claim 17, wherein the longitudinal axis (88) of grip portion (89) defines an angle of about 0 degrees with the plane (93) of the foot section of cover (84) and with the radial plane of zero compartment (31) of the compartment body (11) when cover (84) is placed on the magazine.

19. A magazine according to claim 15, characterized in that cover (84) includes on its upper surface a concentric axially projecting annular rib (96) which has a radius smaller than that of the tangential plane (93) of the foot section and, when the cover (84) and the lower side of the magazine are locked together, forms a spacing ring for mounting the cover on the facing lower side of outer ring (23) of compartment body (11), in that the locking means (97) of cover (84) are provided at the radially inward side of the annular rib (96) and in that projections (98) of holding ring (55), which project downwardly beyond the area of bottom plate (19), form the locking means of the magazine.

20. A magazine according to claim 19, characterized in that the locking means (97, 98) form a type of bayonet connection which can be operated by rotation of cover (84) relative to the magazine.

* * * * *